(12) United States Patent
Carmel et al.

(10) Patent No.: US 10,158,541 B2
(45) Date of Patent: *Dec. 18, 2018

(54) GROUP SERVER PERFORMANCE CORRECTION VIA ACTIONS TO SERVER SUBSET

(71) Applicant: AppDynamics LLC, San Francisco, CA (US)

(72) Inventors: Ido Carmel, Mountain View, CA (US); Abhijit Sawant, Hillsborough, CA (US); Raghvendra Singh, Fremont, CA (US); Sastry Konduri, Fremont, CA (US); Takashi Arai, San Francisco, CA (US); Andrew Morgan, Pacifica, CA (US)

(73) Assignee: Cisco Technology, Inc., San Jose, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 15/198,504

(22) Filed: Jun. 30, 2016

(65) Prior Publication Data

US 2016/0315837 A1    Oct. 27, 2016

Related U.S. Application Data

(63) Continuation of application No. 14/018,355, filed on Sep. 4, 2013, now Pat. No. 9,384,114.

(51) Int. Cl.
*G06F 11/00* (2006.01)
*H04L 12/26* (2006.01)
(Continued)

(52) U.S. Cl.
CPC ...... *H04L 43/0817* (2013.01); *G06F 11/0709* (2013.01); *G06F 11/0754* (2013.01);
(Continued)

(58) Field of Classification Search
CPC .. G06F 11/07; G06F 11/0703; G06F 11/0709; G06F 11/0751; G06F 11/0754;
(Continued)

(56) References Cited

U.S. PATENT DOCUMENTS

5,463,768 A * 10/1995 Cuddihy ............. G06F 11/2205
714/37
8,726,092 B1 * 5/2014 Gray ..................... G06F 11/079
714/38.1
(Continued)

*Primary Examiner* — Gabriel Chu
(74) *Attorney, Agent, or Firm* — Parker Ibrahim & Berg LLP; James M. Behmke; Stephen D. LeBarron (57) ABSTRACT

Business transactions and the nodes processing the transactions are monitored and actions are applied to one or more nodes when a performance issue is detected. A performance issue may relate to a metric associated with a transaction or node that processes the transaction. If a performance metric determined from data captured by monitoring does not satisfy a health rule, the policy determines which action should be performed to correct the performance of the node. When a problem is detected for multiple nodes, the present technology may address a subset of the multiple nodes rather than apply an action to each node experiencing the problem. When a solution is found to correct the problem with the subset of nodes, the solution may be applied to the other nodes experiencing the same problem.

12 Claims, 5 Drawing Sheets

(51) Int. Cl.
- *G06F 11/07* (2006.01)
- *H04L 12/24* (2006.01)
- *G06F 11/34* (2006.01)
- *G06Q 30/06* (2012.01)
- *H04L 29/06* (2006.01)
- *H04L 29/08* (2006.01)

(52) U.S. Cl.
CPC .......... *G06F 11/0793* (2013.01); *G06F 11/34* (2013.01); *G06F 11/3495* (2013.01); *G06Q 30/06* (2013.01); *H04L 41/5025* (2013.01); *H04L 43/16* (2013.01); *H04L 67/16* (2013.01); *H04L 69/00* (2013.01); *G06F 11/3409* (2013.01); *G06F 11/3433* (2013.01); *G06F 11/3466* (2013.01); *G06F 2201/81* (2013.01); *G06F 2201/815* (2013.01); *G06F 2201/87* (2013.01); *G06F 2201/875* (2013.01)

(58) Field of Classification Search
CPC .. G06F 11/0757; G06F 11/076; G06F 11/079; G06F 11/0793; G06F 11/20; G06F 11/22; G06F 11/2257; G06F 11/2268; G06F 11/2273; G06F 11/2294; G06F 11/30; H04L 43/00; H04L 43/08; H04L 43/0805; H04L 43/0817; H04L 43/16
See application file for complete search history.

(56) References Cited

U.S. PATENT DOCUMENTS

| | | | |
|---|---|---|---|
| 8,862,947 B1* | 10/2014 | Gray | G06F 11/076 714/38.14 |
| 9,537,787 B2* | 1/2017 | Bachar | H04L 47/70 |
| 2005/0120273 A1* | 6/2005 | Hudson | G06F 11/0748 714/38.11 |
| 2006/0156141 A1* | 7/2006 | Ouchi | G05B 23/0248 714/742 |
| 2006/0184977 A1* | 8/2006 | Mueller | H04H 20/38 725/86 |
| 2007/0006217 A1* | 1/2007 | Tammana | G06F 8/61 717/174 |
| 2011/0066908 A1* | 3/2011 | Bartz | G06F 11/0709 714/746 |
| 2012/0137182 A1* | 5/2012 | Zhang | G06F 11/0775 714/48 |
| 2012/0144236 A1* | 6/2012 | Black | H04L 41/145 714/25 |
| 2013/0073896 A1* | 3/2013 | Le Scouarnec | G06F 11/1092 714/6.3 |
| 2014/0189086 A1* | 7/2014 | Chattopadhyay | H04L 41/145 709/223 |
| 2014/0289551 A1* | 9/2014 | Balakrishnan | G06F 11/004 714/2 |
| 2015/0019713 A1* | 1/2015 | Bugenhagen | H04L 43/0811 709/224 |

* cited by examiner

GROUP SERVER PERFORMANCE CORRECTION VIA ACTIONS TO SERVER SUBSET

CROSS-REFERENCE TO RELATED APPLICATIONS

This application is a continuation of U.S. patent application Ser. No. 14/018,355, titled "GROUP SEVER PERFORMANCE CORRECTION VIA ACTIONS TO SERVER SUBSET," filed, Sep. 4, 2013, the disclosure of which is incorporated herein by reference.

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

Monitoring a web application helps to provide insight regarding bottle necks in communication, communication failures and other information regarding performance of the services that provide the web application. When a problem is detected with a web application, the problem may be reported to an administrator. The administrator typically takes the one or more applications that have an issue offline to correct the problem. This results in a loss of service from disabling the web applications for some period of time. When multiple applications are discovered to have a problem and are taken offline by an administrator, the loss of service may be very significant to the service provider, resulting in loss of business and customer loyalty.

There is a need in the art for web service monitoring which may correct applications performing less than optimally while minimizing loss of service provided to customers.

SUMMARY OF THE CLAIMED INVENTION

The present technology may monitor business transactions and the nodes processing the transactions. Actions are applied to one or more nodes when a performance issue is detected. A performance issue may relate to a metric associated with a transaction or node that processes the transaction. If a performance metric determined from data captured by monitoring does not satisfy a health rule, the policy determines which action should be performed to correct the performance of the node. When a problem is detected for multiple nodes, the present technology may address a subset of the multiple nodes rather than apply an action to each node experiencing the problem. When a solution is found to correct the problem with the subset of nodes, the solution may be applied to the other nodes experiencing the same problem.

An embodiment may include a method for monitoring a business transaction. A determination may be made that a metric associated with each of a plurality of nodes of a distributed server system do not satisfy a threshold. A first corrective action may then be applied to a first subset of the plurality of nodes. The first corrective action may be applied to the remainder of the nodes upon detecting the first subset of nodes satisfy the threshold after the first corrective action is applied.

An embodiment may include a system for monitoring a business transaction. The system may include a processor, a memory and one or more modules stored in memory and executable by the processor. When executed, the one or more modules may determine that a metric associated with each of a plurality of nodes of a distributed server system do not satisfy a threshold, apply a first corrective action to a first subset of the plurality of nodes, and apply the first corrective action to the remainder of the nodes upon detecting the first subset of nodes satisfy the threshold after the first corrective action is applied.

DETAILED DESCRIPTION

Business transactions involving multiple nodes are monitored and actions are applied to one or more nodes when a performance issue is detected. A performance issue may relate to a metric associated with a transaction or node that processes the transaction. When a problem is detected for multiple nodes, the present technology may address a subset of the multiple nodes rather than apply an action to each node experiencing the problem. When a solution is found to correct the problem with the subset of nodes, the solution may be applied to the other nodes experiencing the same problem.

Applications are monitored by a combination of agents and one or more controllers. A controller may receive data captured and transmitted to the controller by one or more agents located on each of several distributed application servers. The controller may include a set of health rules, policies, and actions. If a performance metric determined from the captured does not satisfy a health rule, the policy determines which action should be performed to correct the performance of the node. A node may include any entity that runs software which is relevant to an application being monitored. A cluster is a group of nodes relating to a singular purpose or function. Actions may be applied in one or more nodes of an application.

A health rule violation may occur in each node in a cluster of nodes. A cluster may be identified by a system or administrator, by behavior, or some other parameter. In such instances, an action may be applied to a subset of the clusters. The subset may be selected at random, may be selected at least in part on a parameter, or based on some other factor. Examples of parameters include geographic location, business transaction, occurrence of a health rule violation, and other parameters.

Actions may be applied by agents located at or in communication with the node. There may be one or more types of agents residing on an application server which may apply an action. A machine agent may reside on a server, may monitor basic hardware and software metrics, and may perform basic instructions to the server. Examples of measurements taken by a machine agent include memory usage, processor usage, and other metrics. Other agents may include a java agent or a PHP agent, each of which may be utilized to collect data, instrument code at the application server on which they are installed, execute business logic, and other functionality.

Figure 1:
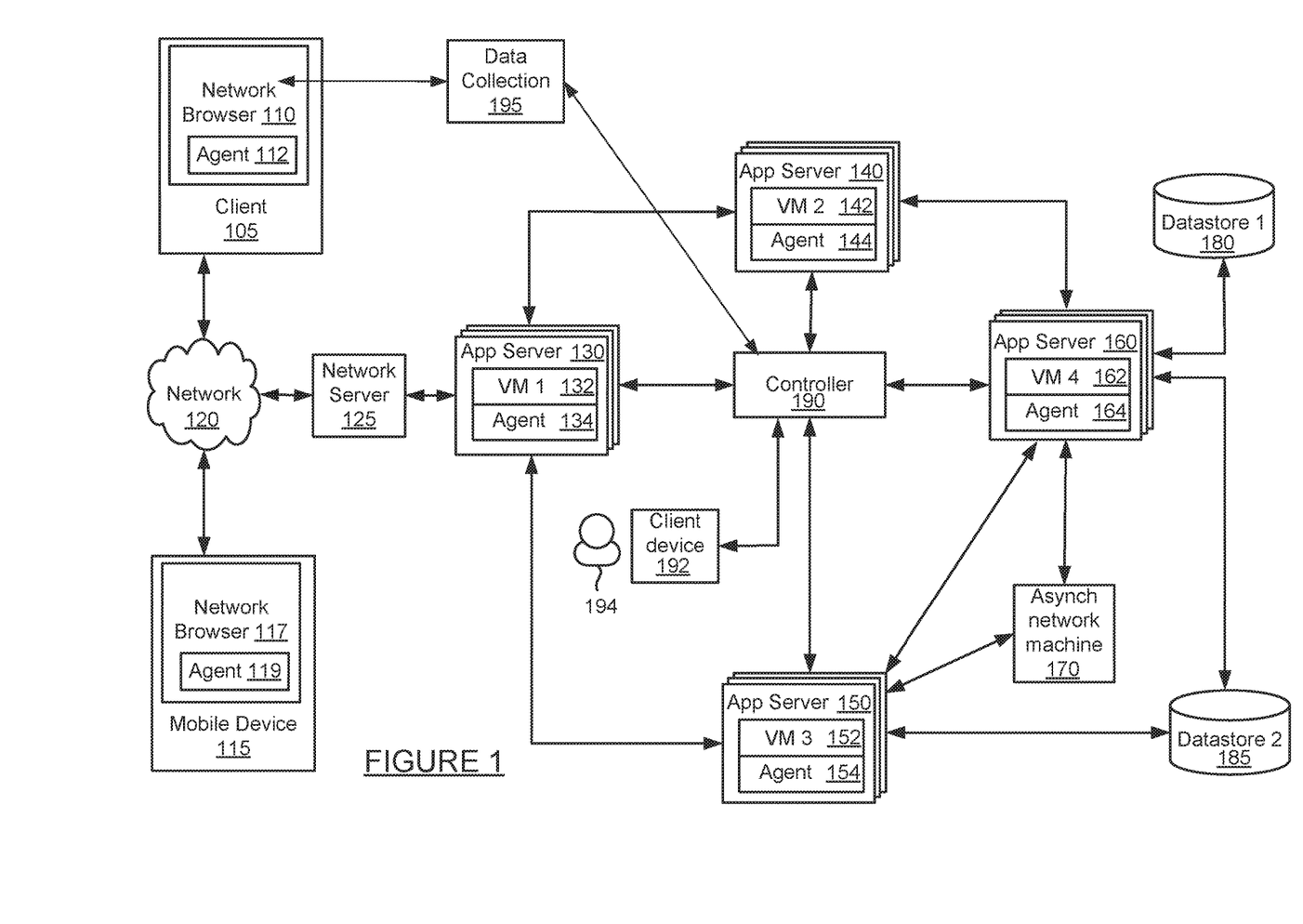
FIG. 1 is a system for monitoring and managing application performance.

The present technology may monitor applications and nodes and apply actions to nodes as needed within the system for monitoring business transactions. FIG. 1 is an exemplary system for monitoring business transactions. System 100 of FIG. 1 includes client device 105 and 192, mobile device 115, network 120, network server 125, application servers 130, 140, 150 and 160, asynchronous network machine 170, data stores 180 and 185, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Mobile device 115 is connected to network 120 and may be implemented as a portable device suitable for receiving content over a network, such as for example a mobile phone, smart phone, or other portable device. Both client device 105 and mobile device 115 may include hardware and/or software configured to access a web service provided by network server 125.

Network 120 may facilitate communication of data between different servers, devices and machines. The network may be implemented as a private network, public network, intranet, the Internet, a Wi-Fi network, cellular network, or a combination of these networks.

Network server 125 is connected to network 120 and may receive and process requests received over network 120. Network server 125 may be implemented as one or more servers implementing a network service. When network 120 is the Internet, network server 125 may be implemented as a web server. Network server 125 and application server 130 may be implemented on separate or the same server or machine.

Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Virtual machine 132 may be implemented by code running on one or more application servers. The code may implement computer programs, modules and data structures to implement a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. Controller 190 may receive runtime data from each of agents 134-164, associate portions of business transaction data, communicate with agents to configure collection of runtime data, and provide performance data and reporting through an interface. The interface may be viewed as a web-based interface viewable by mobile device 115, client device 105, or some other device. In some embodiments, a client device 192 may directly communicate with controller 190 to view an interface for monitoring data.

Controller 190 may install an agent into one or more virtual machines and/or application servers 130. Controller 190 may receive correlation configuration data, such as an object, a method, or class identifier, from a user through client device 192.

Data collection server 195 may communicate with client 105, 115 (not shown in FIG. 1), and controller 190, as well as other machines in the system of FIG. 1. Data collection server 195 may receive data associated with monitoring a client request at client 105 (or mobile device 115) and may store and aggregate the data. The stored and/or aggregated data may be provided to controller 190 for reporting to a user.

Figure 2:
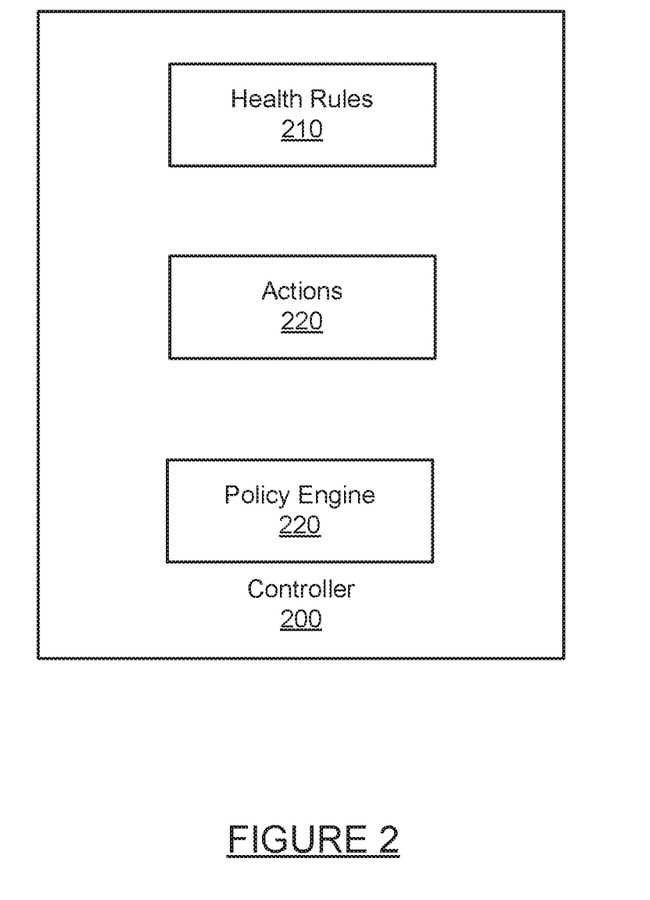
FIG. 2 is a block diagram of a controller.

Controller 190 may receive data from each of agents 134-154, may detect nodes that are not performing as desired, and may initiate actions on one or more of the nodes. FIG. 2 is a block diagram of a controller. Controller 200 may be used to implement controller 190 of the block diagram of FIG. 1. Controller 200 may include health rules 210, actions 220, and policy engine 220. Health rules 210 may include one or more rules which specify an expression involving a metric. The expression may relate to one or more business applications, a method, a cluster, a node, a resource, or some other entity. Examples of an expression may include "response time greater than one second", or "CPU usage greater than 80%", "processing time greater than a fourth standard deviation," "error rate greater than 0.5%", or some other metric. As such, a metric may include values of performance data detected or generated from monitoring any part of a system such that described with respect to FIG. 1, errors and error rates, and other data and events having a value.

Actions 220 may be applied to a resource per a decision by policy engine 220. The actions may be performed by a machine agent or software agent. The actions may create additional instances of virtual machines, restart a machine, execute a string of commands via script code, and perform other operations. Additional examples of actions include configuring a new or restarted virtual machine, installing an agent in a virtual machine, applying a configuration to a virtual machine or application, restarting an application, and other actions.

Policy engine 220 determines what action should be applied to an application or node based on the health rule violation detected. A policy engine 220 may detect that a health rule is violated by a particular node and select a particular action to apply to the node. Policy engine 220 may retrieve a list of health rule violations, the health rule violator, and corresponding action from a table of corresponding health rules and actions. In this case, health rules 210 and actions 220 may be stored and correlated together in a table at controller 200.

Figure 3:
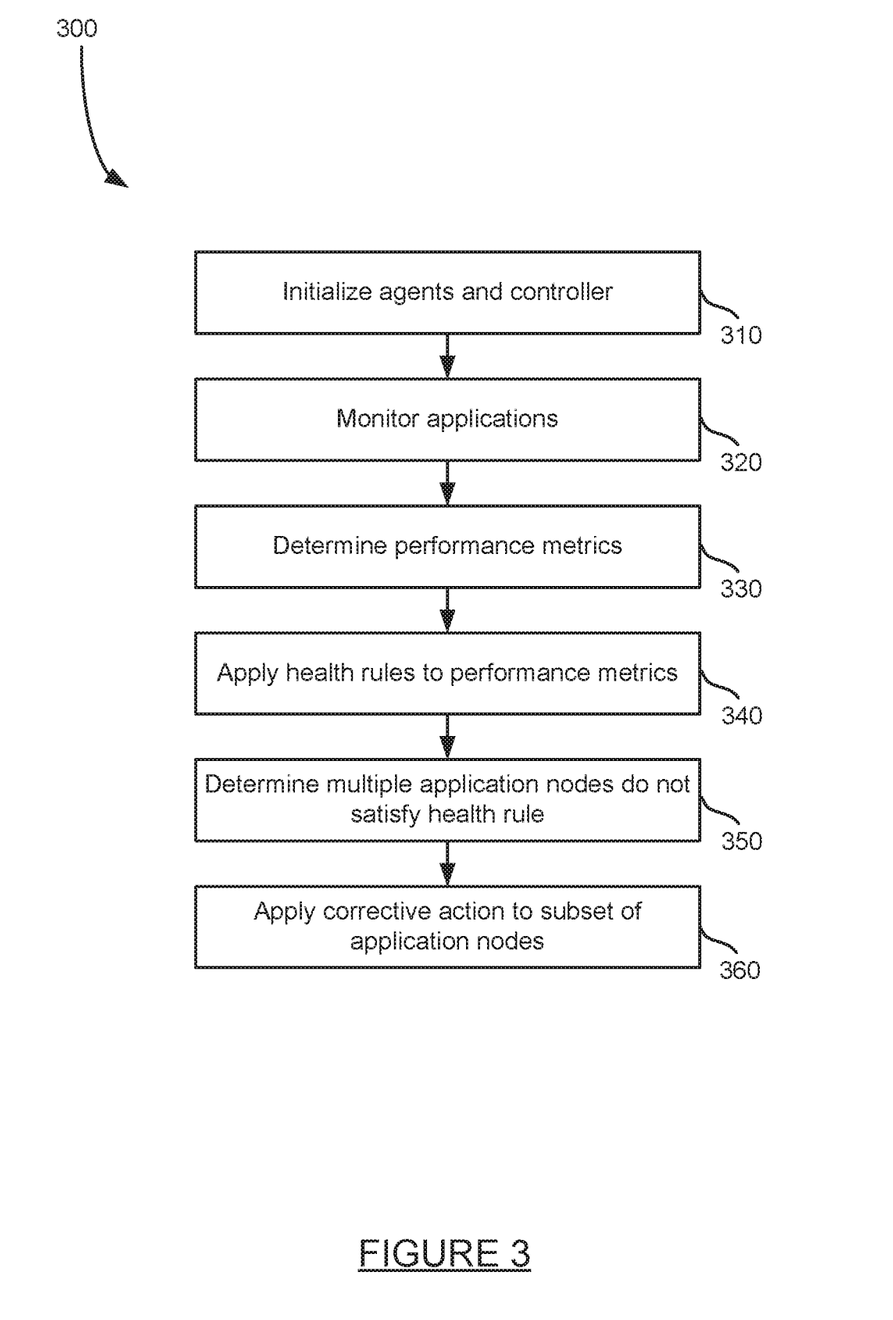
FIG. 3 is an exemplary flowchart for managing application performance.

FIG. 3 is an exemplary flowchart for managing application performance. First, agents and a controller are initialized at step 310. Initializing the agents and controller may include installing agents on nodes of a distributed system, instrumenting code in an application by the agents, and other configurations to the agents and controller. Applications may be monitored at step 320. The applications may be monitored by one or more agents located at or in communication with the applications. The agents may collect data, aggregate the data, and send data to a controller. The agents may also send raw data without aggregating the data to controller 190. More information for monitoring an application is disclosed in U.S. patent application no. U.S. patent application Ser. No. 12/878,919, titled "Monitoring Distributed Web Application Transactions," filed on Sep. 9, 2010, U.S. patent application Ser. No. 13/189,360, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Performance metrics may be determined at step 330. The metrics may include performance data values such as response time, CPU usage, memory usage, and other metrics. The metric may include any measure of performance or usage by node software or hardware on which the node software executes, as well as a combination of software applications and hardware applications. The metrics may be determined from data collected and aggregated by agents 134-164 of the system of FIG. 1 and reported to controller 190.

Health rules may then be applied nodes at step 340. The health rules may be applied to node performance metrics by health rule module 210 of controller 200. Applying the health rules to the performance metrics may determine if a metric satisfies a threshold or other expression indicated in the health rule. A determination may then be made as to whether the multiple application nodes do not satisfy a health rule at step 350. In some cases, multiple nodes may collectively not satisfy a particular health rule. In many instances, the multiple nodes may not satisfy the health rule due to the same reasons. In some embodiments, the multiple nodes may fail to satisfy the health rule for the same reason but at different degrees of violation. For example, a first node may violate a CPU usage limit of 60% by using CPU usage at 70% while another node may violate the rule with a CPU usage at 80%.

A corrective action may be applied to a subset of the nodes which violate the health rule at step 360. Rather than bring all nodes in a cluster which violate the health rule offline, the present invention may bring fewer than all of these nodes offline in order to find a solution. This provides a benefit of not completely halting the operation of nodes which may operate in a limited capacity although are not operating as desired. The nodes for applying the corrective action may be selected at random. In some embodiments, the nodes may optionally be selected based at least in part on one or more parameters. Applying corrective action to a subset of application nodes is discussed in more detail below with respect to the method of FIG. 4.

Figure 4:
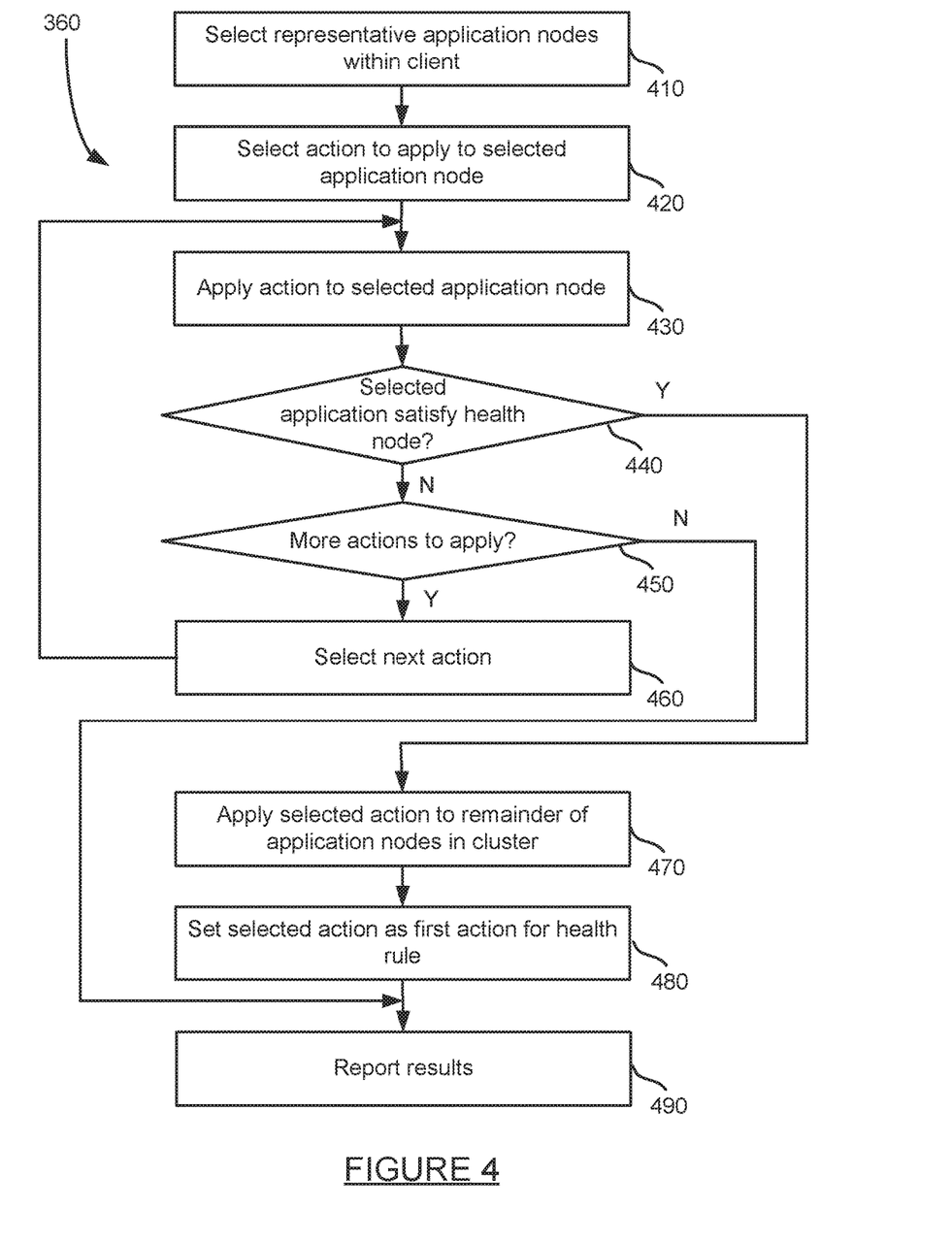
FIG. 4 is an exemplary flowchart for applying corrective actions to nodes.

FIG. 4 is an exemplary flowchart for applying corrective actions to nodes. The method of FIG. 4 provides more information for step 360 in the method of FIG. 3. First, a representative application node within a cluster of nodes is selected at step 410. The selected subset may be randomly chosen from the cluster of nodes. In some instances, the selected subset may be based at least in part on one or more parameters. The nodes may be chosen randomly, at least in part on one or more parameters, as well as based on other techniques. The parameters may include a geo location of the device which violated the health rule, a history of the machine which violated the health rule, a date and time of the violation, a platform of the machine which violated the health rule, and other parameters. In some embodiments, the parameters may also be used to define one or more clusters or nodes. For example, if ten nodes do not satisfy a health rule, and five of the nodes are in the United States and five of the nodes are in Germany, the ten nodes may be divided into two clusters—one cluster of the five United States nodes and a second cluster of the five nodes in Germany.

An action is selected to apply to the selected application node at step 420. The action may be selected by policy engine 220. The policy engine may be configured to do a particular action for a particular health rule violation. Different levels of violations may correspond to different actions. In some embodiments, the selected action may be a first action from a list of several actions. The actions may be presorted based on the probability they have of succeeding.

Next, the selected action is applied to the selected application node at step 430. The action may be implemented by script code, via an instruction to an agent, or in some other manner.

A determination is made as to whether a selected node which received the applied action satisfies a health rule at step 440. Once the action is applied to the node, the node is monitored to see if an improvement can be observed. In some embodiments, the selected node performance need not completely satisfy the health node, but may still be reported if an improvement in performance is observed in view of the previous performance of the node. If the selected application does not satisfy the health node (or does not improve performance), a determination is made as to whether there are more actions to apply at step 450. For example, there may be additional actions in a list of actions to apply to the particular type of node in view of the particular health rule violation. If there are more actions to apply, the next action is selected at step 460 and the method of FIG. 4 returns to step 430.

If the selected application does satisfy the health node, the selected action may be applied to the remainder of the application nodes in the cluster at step 470. The selected action may be applied if the health rule is satisfied or there is improvement in the performance of the node. The selected action may then be set as the first action in a list of actions to be applied for future health rule violations of this type at step 480. The results are then reported to an administrator or otherwise, as configured by a user or administrator, at step 490.

Figure 5:
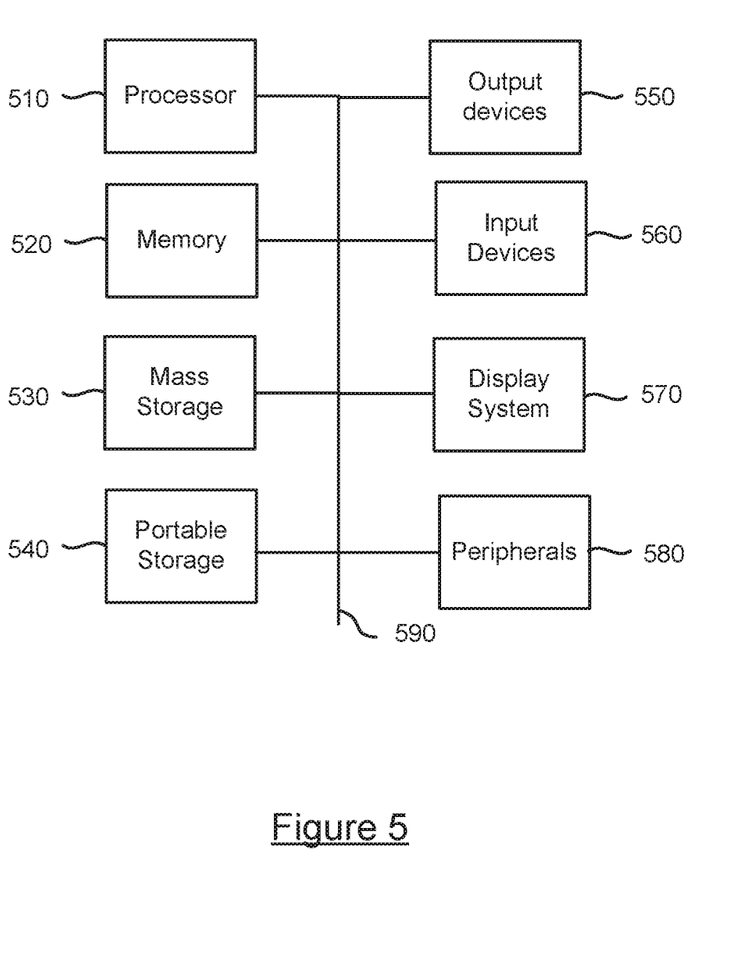
FIG. 5 is a block diagram of a computer system for implementing the present technology.

FIG. 5 is a block diagram of a computer system for implementing the present technology. System 500 of FIG. 5 may be implemented in the contexts of the likes of clients 105 and 192, network server 125, application servers 130-160, and data stores 190-185. A system similar to that in FIG. 5 may be used to implement mobile device 115, but may include additional components such as an antenna, additional microphones, and other components typically found in mobile devices such as a smart phone or tablet computer.

The computing system 500 of FIG. 5 includes one or more processors 510 and memory 510. Main memory 510 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 510 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 510.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring a business transaction, comprising:

determining, by a controller in a computer network, that a metric associated with each of a plurality of nodes of a distributed server system does not satisfy a threshold;

applying, by a controller in a computer network, a first corrective action to a first subset of the plurality of nodes; and applying, by a controller in a computer network, the first corrective action to the remainder of the nodes upon detecting the first subset of nodes satisfy the threshold after the first corrective action is applied.

2. The method of claim 1, further including:

determining a metric for each of the plurality of nodes; and determining the metric for each node does not satisfy a health rule, the health rule including a threshold.

3. The method of claim 1, the first corrective action applied by an agent residing on a machine with the node.

4. The method of claim 3, wherein applying includes transmitting an instruction to an agent on a remote server by a controller.

5. The method of claim 1, the first corrective action selected by a policy based on a violation of a health rule including the threshold.

6. The method of claim 1, further comprising selecting the first subset of the plurality of nodes at random.

7. The method of claim 1, further comprising selecting the first subset of the plurality of nodes based on a parameter.

8. The method of claim 1, further comprising applying a second corrective action to a second subset of the plurality of nodes while the first corrective action is applied to the first subset of nodes.

9. The method of claim 1, further comprising:
   determining the first subset of nodes did not satisfy the threshold after the first action was applied to the first subset of nodes;
   applying a second corrective action to the first subset of nodes; and
   applying the second corrective action to the remainder of the nodes upon detecting the first subset of nodes satisfy the threshold after the second corrective action is applied.

10. The method of claim 1, further comprising configuring a list of corrective actions such that the first corrective action would be applied to subsequent nodes having a metric that fails to satisfy the threshold before other nodes in the list of corrective actions if applying the first corrective action results in the first subset of nodes satisfying the threshold after the first action is applied.

11. A non-transitory computer readable storage medium having embodied thereon a program, the program being executable by a processor to perform a method for monitoring a business transaction, the method comprising:
   determining at a controller, that a metric associated with each of a plurality of nodes of a distributed server system does not satisfy a threshold;
   applying, by the controller, a first corrective action to a first subset of the plurality of nodes; and
   applying, by the controller, the first corrective action to the remainder of the nodes upon detecting the first subset of nodes satisfy the threshold after the first corrective action is applied.

12. A system for monitoring a business transaction, comprising:
   a processor;
   a memory; and
   one or more modules stored in memory and executable by a processor as a controller in a computer network to determine that a metric associated with each of a plurality of nodes of a distributed server system does not satisfy a threshold, apply a first corrective action to a first subset of the plurality of nodes, and apply the first corrective action to the remainder of the nodes upon detecting the first subset of nodes satisfy the threshold after the first corrective action is applied.

* * * * *